US012454202B2

(12) United States Patent
Strasser

(10) Patent No.: US 12,454,202 B2
(45) Date of Patent: Oct. 28, 2025

(54) VEHICLE SEAT CONSOLE

(71) Applicant: Bayerische Motoren Werke Aktiengesellschaft, Munich (DE)

(72) Inventor: Dieter Strasser, Oberhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 367 days.

(21) Appl. No.: 18/016,952

(22) PCT Filed: Sep. 2, 2021

(86) PCT No.: PCT/EP2021/074215
§ 371 (c)(1),
(2) Date: Jan. 19, 2023

(87) PCT Pub. No.: WO2022/053380
PCT Pub. Date: Mar. 17, 2022

(65) Prior Publication Data
US 2023/0347796 A1   Nov. 2, 2023

(30) Foreign Application Priority Data
Sep. 10, 2020 (DE) ............. 10 2020 123 609.3

(51) Int. Cl.
*B60N 2/06* (2006.01)
*B60N 2/07* (2006.01)
*B60N 2/02* (2006.01)

(52) U.S. Cl.
CPC ............ *B60N 2/062* (2013.01); *B60N 2/065* (2013.01); *B60N 2/074* (2013.01); *B60N 2002/0208* (2013.01)

(58) Field of Classification Search
CPC ........ B60N 2/015; B60N 2/062; B60N 2/065; B60N 2/0735; B60N 2/0737; B60N 2/20; B60N 2/22; B60N 2002/0208
(Continued)

(56) References Cited

U.S. PATENT DOCUMENTS 5,529,275 A    6/1996  Cornell
7,124,851 B2 * 10/2006 Smith ................ B60R 21/013
                                              296/68.1
(Continued)

FOREIGN PATENT DOCUMENTS

DE   10 2006 031 886 A1    3/2007
DE   10 2006 002 732 A1    8/2007
(Continued)

OTHER PUBLICATIONS

International Search Report (PCT/ISA/210) issued in PCT Application No. PCT/EP2021/074215 dated Nov. 23, 2021 with English translation (four (4) pages).
(Continued)

*Primary Examiner* — Jason S Daniels
(74) *Attorney, Agent, or Firm* — Crowell & Moring LLP

(57) ABSTRACT

A vehicle seat base, also known as a console, movably attaches a vehicle seat on a vehicle interior floor. The vehicle seat is movably arranged parallel to the vehicle longitudinal direction and parallel to the vehicle lateral direction via a first rail assembly running parallel to the vehicle longitudinal direction and a second rail assembly running parallel to the vehicle lateral direction. The vehicle interior floor has a step running in the vehicle lateral direction that divides the floor in the vehicle longitudinal direction into a first floor region lying at a lower height and a second floor region lying at a higher height, and the floor is constricted by wheel housings that penetrate into the floor from the respective exterior, behind the vehicle seat. The second rail assembly ascends towards the vertical vehicle longitudinal central plane from the vehicle exterior running parallel to the vehicle longitudinal direction.

7 Claims, 3 Drawing Sheets

(58) Field of Classification Search
USPC ................................ 296/65.05, 65.11, 65.13
See application file for complete search history.

(56) References Cited

U.S. PATENT DOCUMENTS

| | | | |
|---|---|---|---|
| 7,252,319 B2 * | 8/2007 | Toyota ................... | B60N 2/309 296/65.09 |
| 8,573,675 B2 * | 11/2013 | Line ...................... | B60N 2/165 296/64 |
| 2005/0127645 A1 | 6/2005 | Smith et al. | |
| 2009/0230712 A1 | 9/2009 | Maier et al. | |
| 2013/0221720 A1 | 8/2013 | Pluta et al. | |

FOREIGN PATENT DOCUMENTS

| | | |
|---|---|---|
| DE | 10 2008 004 231 A1 | 7/2009 |
| DE | 10 2010 004 654 A1 | 3/2012 |
| EP | 0 401 092 A1 | 12/1990 |
| EP | 1728692 A2 * 12/2006 | ............... B60N 2/06 |
| JP | 5918833 B1 * 5/2016 | ............. B60N 2/062 |

OTHER PUBLICATIONS

German-language Written Opinion (PCT/ISA/237) issued in PCT Application No. PCT/EP2021/074215 dated Nov. 23, 2021 (six (6) pages).
German-language Search Report issued in German Application No. 10 2020 123 609.3 dated Nov. 20, 2020 with partial English translation (10 pages).

* cited by examiner

VEHICLE SEAT CONSOLE

TECHNICAL FIELD

The invention relates to a vehicle seat console. It further relates to a vehicle seat having such a vehicle seat console and a vehicle having such a vehicle seat.

BACKGROUND AND SUMMARY

Although the vehicle seats in the second rear seat row of a conventional passenger vehicle can be displaced within narrow ranges in a longitudinal vehicle direction and also the inclination of the backrest thereof can be adjusted in a narrow angular range, it is not possible to adjust the rear seats in a reclined seat or resting seat position since the adjustability of the backrests toward the rear is limited by transverse body reinforcements which extend behind these seats and retracted wheel housings. Although it would be conceivable to position the seats of the rear seat row in the transverse vehicle direction closer to the vehicle center and higher, this would result in a more difficult entry and exit for the relevant seat.

DE 10 2006 022 732 A1 and DE 10 2008 004 231 A1 disclose in each case a seat arrangement for a motor vehicle, in which the vehicle seat is displaceable in a guided manner in a longitudinal vehicle direction and in the transverse vehicle direction along a slotted member. The vehicle seat is thereby also automatically displaced in the transverse direction when displaced in the longitudinal direction. The vehicle seat is guided in longitudinal rails which are themselves guided in transverse rails.

An object of the present invention is to provide a vehicle seat console which also enables a rear vehicle seat to be used as a reclining or resting seat.

This object is achieved in accordance with the independent claims.

A vehicle seat console for displaceable fitting of a vehicle seat in a vehicle which has a vehicle body having a base structure, wherein the base structure forms a vehicle interior base on which the vehicle seat is arranged so as to be able to be displaced parallel with the longitudinal vehicle direction and parallel with the transverse vehicle direction by means of at least a first rail arrangement which extends parallel with the longitudinal vehicle direction and at least a second rail arrangement which extends parallel with the transverse vehicle direction, wherein the vehicle interior base has a step which extends in the transverse vehicle direction and which subdivides the vehicle interior base in the longitudinal vehicle direction into a lower first base region and a higher second base region, and wherein the vehicle interior base is constricted behind the at least one vehicle seat by means of wheel housings which penetrate from the respective outer side, is characterized in that the second rail arrangement rises from the outer vehicle side which extends parallel with the longitudinal vehicle direction toward the vertical vehicle longitudinal center plane.

The configuration according to the invention of the vehicle seat console enables a vehicle seat of the second rear seat row for adjustment from the normal upright seat position into the reclined seat or resting seat position to be first displaced toward the vehicle center, wherein the seat is raised, and afterward allows the seat and in particular the backrest to be adjusted into the reclined seat or resting seat position. The backrest can thus be inclined past the wheel housing and the body reinforcements which extend transversely behind the seat in the normal upright seat position, as a result of the higher positioning of the vehicle seat, no longer form an obstacle which limits the inclination angle of the backrest.

Other preferred and advantageous embodiment features of the vehicle seat console according to the invention are set out in the dependent claims.

Preferably, the first rail arrangement has at least one lower guiding element which is connected to the base structure and at least one upper guiding element which is connected to the second rail arrangement, of which at least one is in the form of a guide rail.

It is also advantageous for the second rail arrangement to have at least one lower guiding element which is connected to the first rail arrangement and at least one upper guiding element which is connected to the vehicle seat, of which at least one is in the form of a guide rail.

A particularly advantageous development is characterized in that there is provided for seat adjustment a control device which is constructed in such a manner that the vehicle seat when displaced from a front seat position into a reclining or resting position which is inclined toward the rear is initially displaced relative to the vertical vehicle longitudinal center plane and is in this instance raised parallel with the vehicle vertical axis direction and subsequently displaced to the rear parallel with the longitudinal vehicle direction.

A particularly advantageous embodiment of the invention which can be combined with other embodiments is characterized in that there is provided for seat adjustment a control device which is constructed in such a manner that the vehicle seat when displaced from a front seat position into a reclined or resting position which is inclined toward the rear is initially displaced relative to the vertical vehicle longitudinal center plane and is in this instance raised parallel with the vehicle vertical axis direction and synchronously or subsequently the vehicle seat backrest is inclined toward the rear.

The invention is also based on a vehicle seat having such a vehicle seat console.

Finally, the invention is further based on a vehicle, in particular a motor vehicle, having at least one such vehicle seat.

Preferred embodiments of the invention with additional embodiment details and other advantages are described and explained in greater detail below with reference to the appended drawings.

DETAILED DESCRIPTION OF THE DRAWINGS

Figure 1:
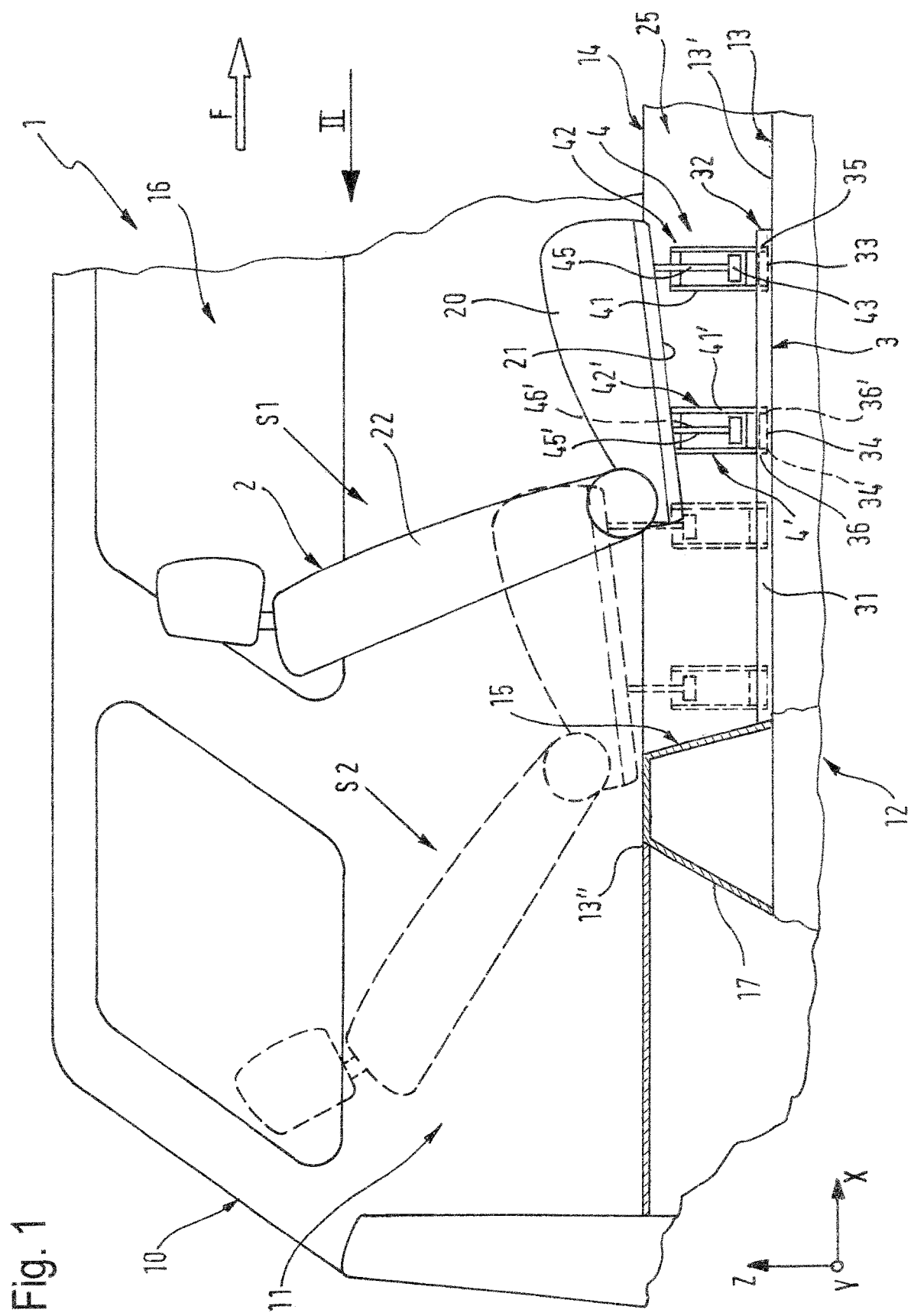
FIG. 1 is a partially sectioned partial side view of a vehicle having a vehicle seat which is provided with a console according to the invention.

FIG. 1 shows a partially sectioned side view of the rear interior of a vehicle 1. The vehicle 1 has a vehicle body 10 having a base structure 12 which forms a vehicle interior base 13 and which has a central tunnel-like member 14 which extends centrally in the longitudinal vehicle direction X and which extends upward (in a Z direction) beyond the vehicle interior base 13.

The vehicle interior base 13 has a step 15 which extends in the transverse vehicle direction (Y direction) and which is formed by a transverse beam 17 of the base structure 12 of the vehicle 1. This step 15 subdivides the vehicle interior base 13 into a lower, first front base region 13' and a higher, second rear base region 13".

In the rear portion, which is illustrated in FIG. 1, of the driver's cab 16 which is surrounded by the vehicle body 10 there is provided a vehicle seat 2 of a rear seat row having a lower seat portion 20 and a seat backrest 22 which is connected by means of a vehicle seat console 25 to the base structure 12 so as to be able to be longitudinally and transversely displaced. Behind this rear seat row, a luggage space 11 is provided. Of course, apart from this vehicle seat 2 which is shown as the sectioned illustration, there may be arranged in the transverse vehicle direction (Y direction) at the other side of the central tunnel-like member 14 another vehicle seat of the rear seat row which is configured in the same manner as the vehicle seat 2 shown and which is connected to the vehicle 1.

The vehicle seat 2 is illustrated with solid lines in the foremost position thereof for an upright seat position of a passenger (not shown) sitting thereon. The vehicle seat 2 is shown with broken lines in the rearmost position thereof, in which the seat backrest 22 is inclined in a reclined or resting position.

Figure 2:
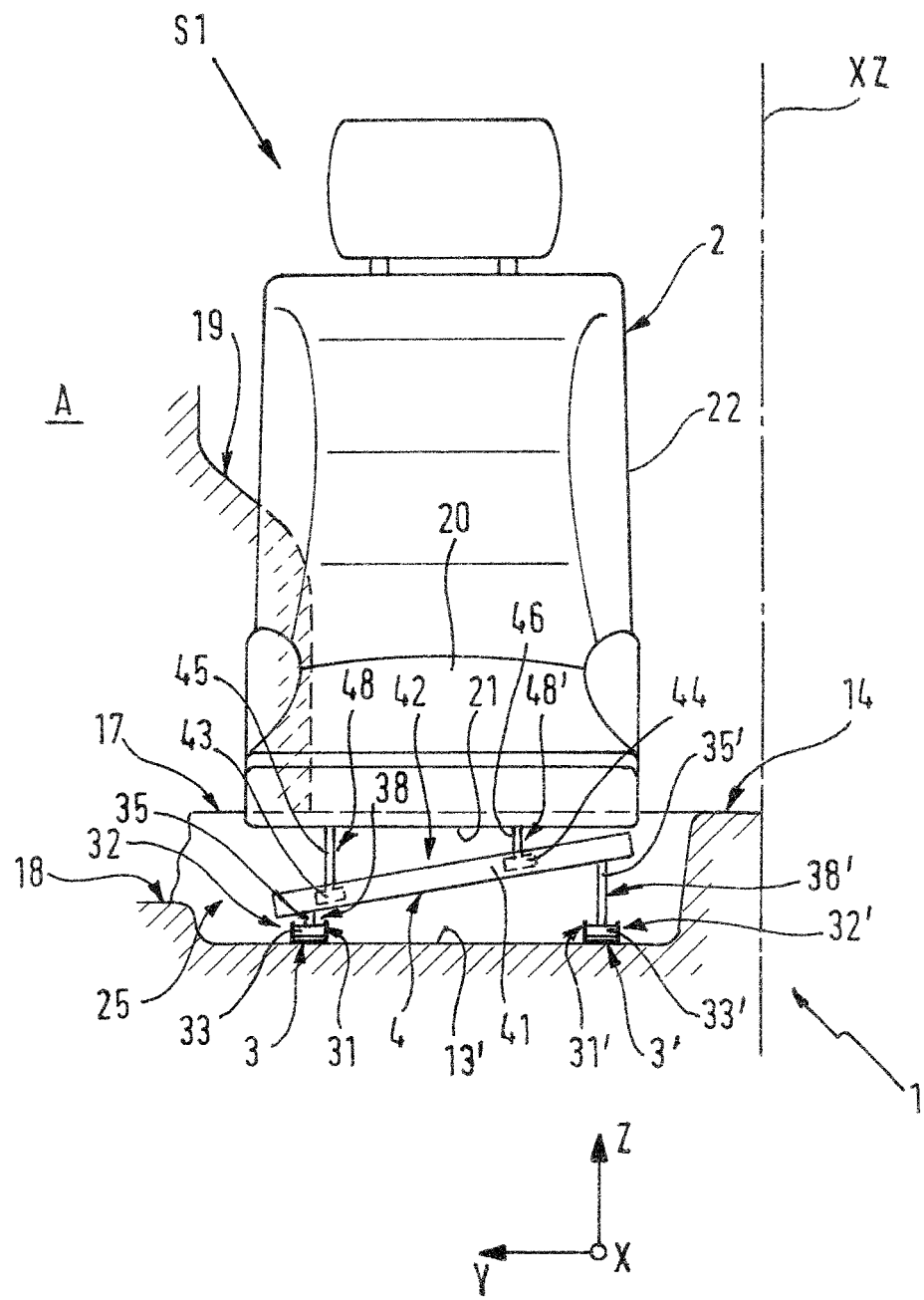
FIG. 2 is a front view of a vehicle seat with the console according to the invention in a lowered, upright seat position in arrow II in FIG. 1.

The vehicle seat 2 is supported on the base structure 12 of the vehicle 1 by means of a first right lower rail arrangement 3 which extends in the longitudinal vehicle direction X, that is to say, parallel with the travel direction F, and a second left lower rail arrangement 3', which extends parallel therewith (FIG. 2), of the vehicle seat console 25 so as to be able to be displaced in the longitudinal vehicle direction (X direction). The bearing by means of the right lower rail arrangement 3 is described below, wherein the left lower rail arrangement 3' is formed in a similar manner.

The respective lower rail arrangement 3, 3' has a lower guiding element 32, 32' which is in the form of a lower longitudinal rail 31, 31' and which is fitted to the vehicle interior base 13 in the region of the front base region 13' thereof. A front lower sliding member 33, 33' and a rear, lower sliding member 34, 34' are supported in the lower longitudinal rail 31, 31' so as to be able to be longitudinally displaced as a respective upper guiding element 38, 38'. At least one of the two lower sliding members 33, 34; 33', 34' of a respective side is driven so as to be able to be longitudinally displaced by means of a drive device which is not illustrated.

Figure 3:
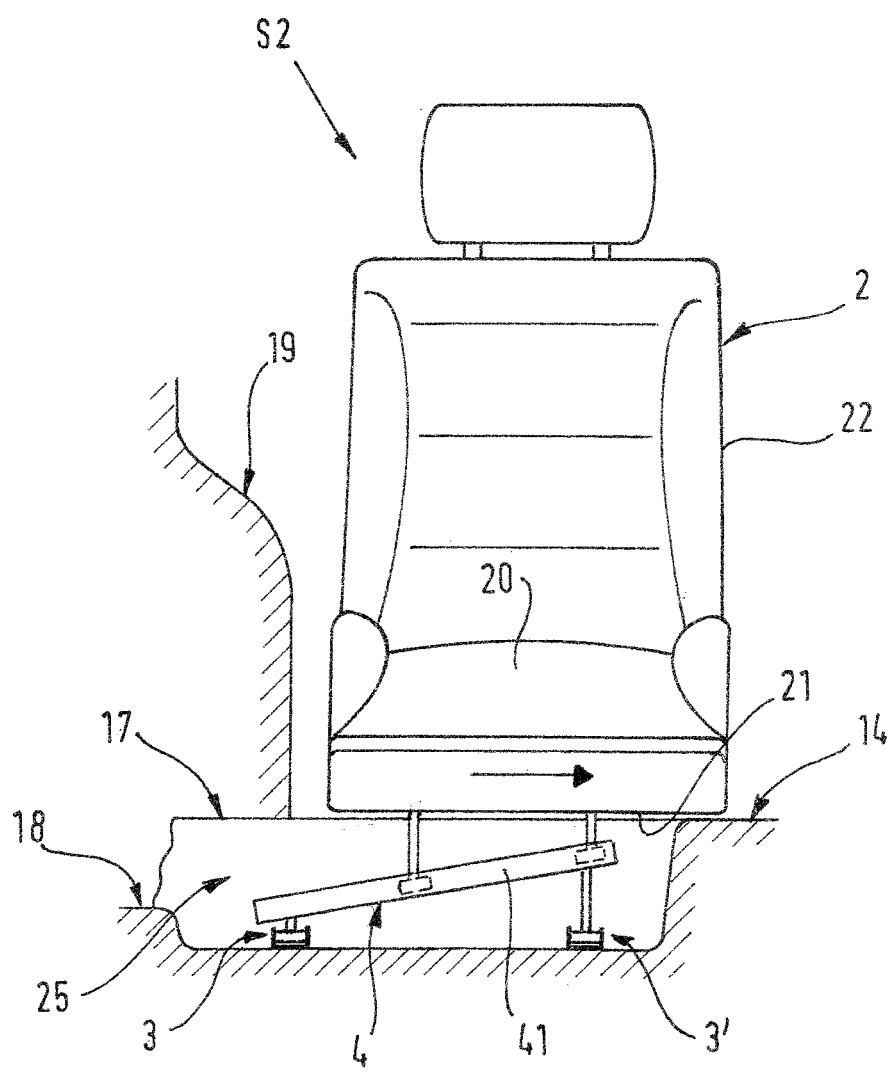
FIG. 3 is the view of the vehicle seat from FIG. 2 in the inwardly displaced and raised state of the vehicle seat.

The respective front lower sliding member 33, 33' is connected by means of an associated front, lower pillar 35, 35' to a front upper transverse rail 41, which forms a lower guiding element 42, of a first, front upper rail arrangement 4. The front lower pillars 35, 35' which carry the front upper transverse rail 41 have different lengths in the vertical extent thereof (in the Z direction), wherein the pillar 35' which is located closer to the central tunnel-like member 14 is longer than the pillar 35 which is located closer to the side sill 18 (FIG. 2), that is to say, closer to the outer vehicle side A. The front, upper transverse rail 41 is thereby inclined in the transverse direction (Y direction) in such a manner that it rises upward in the direction toward the central tunnel-like member 14. The height of the front upper transverse rail 41 in the vicinity of the central tunnel-like member is sized in such a manner that the base 21 of the lower seat portion 20 of the vehicle seat 2 which is supported as described below so as to be able to be transversely displaced in the upper transverse rail 41—in the position thereof close to the central console—is located above the central tunnel-like member 14 and also above the transverse beam 17 in such a manner that the vehicle seat 2 can therefore assume the upper resting or reclined position which is illustrated in FIG. 3 and which is shown with broken lines in FIG. 1.

An upper outer sliding member 43 and an upper inner sliding member 44 are supported in the front upper transverse rail 41 so as to be able to be displaced in the transverse direction (Y direction) as upper guiding elements 48. At least one of these two front upper sliding members 43, 44 is driven so as to be able to be transversely displaced by means of another drive device which is not illustrated. The two front upper sliding members 43, 44 are connected by means of a respective front upper pillar 45, 46 to the base 21 of the vehicle seat 2. The front upper pillars 45, 46 are also of different vertical lengths, wherein the outer pillar 45 is so much longer than the inner pillar 46 that the base 21 of the vehicle seat 2 and consequently the entire vehicle seat 2 in the transverse direction (Y direction) in the end positions thereof (FIG. 2 and FIG. 3) and during transverse displacement is orientated horizontally.

The respective rear lower sliding member 34, 34' is connected by means of an associated rear lower pillar 36, 36' to a rear upper transverse rail 41', which forms a lower guiding element 42', of a second rear upper rail arrangement 4' whose structure, whose longitudinally displaceable support in the lower rail arrangements 3, 3' and whose connection to the base 21 of the vehicle seat 2 by means of rear upper pillars 45', 46' with the transverse displaceability by means of rear upper sliding members 43', 44' which form upper guiding elements 48' in the rear upper transverse rail 41' corresponds to the front upper rail arrangement 4.

As a result of the provision of the inclined upper rail arrangements 4, 4' which rise in the transverse vehicle direction (Y direction) in the direction toward the central-tunnel-like member 14 which extends in the vehicle center in the longitudinal vehicle direction (X direction) above the lower rail arrangements 3, 3' which extend in the longitudinal vehicle direction (X direction), the vehicle seat 2 can initially be displaced upward (in the Z direction) rising in the Y direction (in a YZ plane) and subsequently in the X direction and inclined in a reclined seat or resting seat position.

As a result of the invention, it is ensured that, when sitting upright in a front position of the vehicle seat (FIG. 2), a seat position which is low and located as far as possible toward the outer side (hip point) is assumed by a person sitting on the vehicle seat, whereby entry and exit is facilitated. The displacement, which is initially carried out, of the vehicle seat 2 in a Y direction toward the perpendicular vehicle longitudinal center plane (XZ plane) as schematically illustrated by the arrow 3 in FIG. 3 brings the vehicle seat 2 initially into a higher position closer to the vehicle center, as illustrated in FIG. 3. The subsequent displacement of the vehicle seat 2 in the X direction toward the rear and assuming the reclined or resting position by inclining the seat backrest toward the rear (dashed seat illustration in FIG. 1) are only possible in that the vehicle seat 2 is located far enough toward the inner side and upwardly to pass wheel housings 19 (FIG. 2) which penetrate into the vehicle interior, longitudinal beams (such as the central tunnel-like member 14) and transverse beams 17 or torsion rings.

The invention is not limited to the above embodiment, which serves only to generally explain the core notion of the invention. In the context of the protective scope, the apparatus according to the invention may instead also have embodiments other than those described above. The apparatus may in this instance in particular have features which constitute a combination of the respective individual features of the claims.

Reference numerals in the description and the drawings are used only for a better understanding of the invention and are not intended to limit the protective scope.

LIST OF REFERENCE NUMERALS

1 Vehicle
2 Vehicle seat
3 First right lower rail arrangement
3' Second left lower rail arrangement
3' First lower rail arrangement
4 Second front upper rail arrangement
4' Second rear upper rail arrangement
10 Vehicle body
11 Luggage compartment
12 Base structure
13 Vehicle interior base
13' First front base region
13" Second rear base region
14 Central tunnel-like member
15 Step
16 Vehicle cab
17 Transverse beam
17 Step
18 Wheel housings
20 Lower seat portion
21 Base
22 Vehicle seat backrest
25 Vehicle seat console
31 Lower guide rail
31 Lower longitudinal rail
31' Lower guide rail
31' Lower longitudinal rail
32 Lower guiding element
32' Lower guiding element
33 Front lower sliding member
33' Front lower sliding member
34 Rear lower sliding member
34' Rear lower sliding member
35 Front lower pillar
35' Front lower pillar
36 Rear lower pillar
38 Upper guiding element
38' Upper guiding element
41 Front upper transverse beam
41 Upper guide rail
41' Rear upper transverse rail
42 Lower guiding element
42' Lower guiding element
43 Front upper outer sliding member
43' Rear upper outer sliding member
44 Front upper inner sliding member
44' Rear upper inner sliding member
45 Front upper pillar
45' Rear upper pillar
46 Front upper pillar
46' Rear upper pillar
48 Upper guiding element
48' Upper guiding element
A Outer vehicle side
F Travel direction
S1 Seat position
S2 Reclined and resting position
X Longitudinal vehicle direction
Y Transverse vehicle direction
Z Vehicle vertical axis direction
XZ Vertical vehicle longitudinal center plane

The invention claimed is:

1. A vehicle seat console for movably attaching a reclinable vehicle seat in a vehicle which has a vehicle body, comprising:
a vehicle body base structure that forms a vehicle interior base on which the reclinable vehicle seat is movably arranged parallel to a longitudinal vehicle direction and parallel to a transverse vehicle direction via at least a first rail arrangement which extends parallel to the longitudinal vehicle direction and at least a second rail arrangement which extends parallel to the transverse vehicle direction,
wherein the vehicle interior base has a step which extends in the transverse vehicle direction and which subdivides the vehicle interior base in the longitudinal vehicle direction into a lower first base region and a higher second base region,
wherein the vehicle interior base is constricted behind the reclinable vehicle seat by way of wheel housings which penetrate from the respective outer side, and
wherein the second rail arrangement rises from an outer vehicle side which extends parallel to the longitudinal vehicle direction toward a vertical vehicle longitudinal center plane,
wherein a control device is configured to move the reclinable vehicle seat in both the longitudinal vehicle direction and the transverse vehicle direction to perform seat adjustment.

2. The vehicle seat console according to claim 1, wherein for seat adjustment, the control device is constructed such that the vehicle seat, when displaced from a front seat position into a reclining or resting position which is inclined toward the rear, is initially displaced relative to the vertical vehicle longitudinal center plane and is, in this instance, raised parallel to the vehicle vertical axis direction and subsequently displaced to the rear parallel to the longitudinal vehicle direction.

3. The vehicle seat console according to claim 1, wherein for seat adjustment, the control device is constructed such that the vehicle seat, when displaced from a front seat position into a reclining or resting position which is inclined toward the rear, is initially displaced relative to the vehicle longitudinal center plane and is, in this instance, raised parallel to the vehicle vertical axis direction and synchronously or subsequently the vehicle seat backrest is inclined toward the rear.

4. A vehicle seat comprising a vehicle seat console according to claim 1.

5. A vehicle comprising at least one vehicle seat according to claim 4.

6. A vehicle seat console for movably attaching a vehicle seat in a vehicle which has a vehicle body, comprising:
a vehicle body base structure that forms a vehicle interior base on which the vehicle seat is movably arranged parallel to a longitudinal vehicle direction and parallel to a transverse vehicle direction via at least a first rail arrangement which extends parallel to the longitudinal vehicle direction and at least a second rail arrangement which extends parallel to the transverse vehicle direction,
wherein the vehicle interior base has a step which extends in the transverse vehicle direction and which subdivides the vehicle interior base in the longitudinal vehicle direction into a lower first base region and a higher second base region, wherein the vehicle interior base is constricted behind the at least one vehicle seat by way of wheel housings which penetrate from the respective outer side, and wherein the second rail arrangement rises from an outer vehicle side which extends parallel to the longitudinal vehicle direction toward a vertical vehicle longitudinal center plane, wherein the first rail arrangement has at least one lower guiding element which is connected to the base structure and at least one upper guiding element which is connected to the second rail arrangement, of which at least one is in the form of a lower guide rail.

7. A vehicle seat console for movably attaching a vehicle seat in a vehicle which has a vehicle body, comprising:

a vehicle body base structure that forms a vehicle interior base on which the vehicle seat is movably arranged parallel to a longitudinal vehicle direction and parallel to a transverse vehicle direction via at least a first rail arrangement which extends parallel to the longitudinal vehicle direction and at least a second rail arrangement which extends parallel to the transverse vehicle direction, wherein the vehicle interior base has a step which extends in the transverse vehicle direction and which subdivides the vehicle interior base in the longitudinal vehicle direction into a lower first base region and a higher second base region, wherein the vehicle interior base is constricted behind the at least one vehicle seat by way of wheel housings which penetrate from the respective outer side, and wherein the second rail arrangement rises from an outer vehicle side which extends parallel to the longitudinal vehicle direction toward a vertical vehicle longitudinal center plane, wherein the second rail arrangement has at least one lower guiding element which is connected to the first rail arrangement and at least one upper guiding element which is connected to the vehicle seat, of which at least one is in the form of an upper guide rail.

\* \* \* \* \*